United States Patent
Chernoch

[15] 3,679,999
[45] July 25, 1972

[54] LASER COOLING METHOD AND APPARATUS

[72] Inventor: Joseph P. Chernoch, Scotia, N.Y.
[73] Assignee: General Electric Company
[22] Filed: June 12, 1970
[21] Appl. No.: 45,691

[52] U.S. Cl. ........................................................331/94.5
[51] Int. Cl. ...............................................................H01s 3/00
[58] Field of Search.................................................331/94.5

[56] References Cited

UNITED STATES PATENTS 3,229,222  1/1966  Sorokin et al. ...........................331/94.5
3,383,622  5/1968  Dixon et al. ..............................331/94.5

Primary Examiner—Ronald L. Wibert
Assistant Examiner—Edward S. Bauer
Attorney—John F. Ahern, Paul A. Frank, Paul F. Wille, Frank L. Neuhauser, Oscar B. Waddell and Joseph B. Forman

[57] ABSTRACT

A new laser cooling method is disclosed in which materials in different physical states are laminated about the laser body. Specifically, thin gas layer is used as a heat conductor in thermal contact with the laser body. In contact with the gas layer is a high thermal conductivity solid which is also optically transparent at the pump wavelength. This material, in turn, has its opposite face or edges, or both, in contact with a liquid coolant. Thus, there is provided a cooling method in which gaseous and solid state materials act as heat conductors for liquid cooling the laser apparatus.

4 Claims, 2 Drawing Figures

3,679,999

Inventor:
Joseph P. Chernoch,
by Paul F. Wille
His Attorney.

LASER COOLING METHOD AND APPARATUS

This invention relates to a new method of cooling lasers and, in particular, face pumped lasers, i.e., lasers in which the laser beam reflecting faces are the faces through which the laser is pumped.

In the laser art, as higher and higher output powers are obtained, whether from pulsed or continuously running lasers, more and more stringent requirements are established for the mechanism cooling the laser material. A problem develops, however in attempting to cool the laser material. A liquid coolant is desirable because of the relatively higher heat capacities available in a liquid. However, because total internal reflection within a laser material is dependent upon the refractive index of the material in contact with the pump face, a liquid is not always suitable since it has a relatively high refractive index. Thus, using a liquid coolant increases the angle of incidence of the beam thereby lessening the number of possible internal reflections of the laser beam.

A gas coolant, on the other hand, has a low refractive index, thereby enabling a large number of internal reflections due to the smaller angle of incidence at which total internal reflection takes place. Gas coolant, however, has a low heat capacity. Thus, high pressures and high flow rates are required to achieve the desired degree of cooling. Further uniformity of flow rate must be maintained so as to avoid thermal distortion of the laser.

In view of the foregoing, it is therefore an object of the present invention to provide a laser cooling technique in which the desirable features of gas and liquid cooling are combined. A further object of the present invention is to provide a laser cooling technique in which a layer of gas is utilized as a heat conductor in contact with the laser material.

Another object of the present invention is to provide a means for cooling a laser in which material in the three physical states or phases, solid, liquid, and gas, are laminated together.

A further object of the present invention is to provide a cooling system having low refractive index and high heat capacity for use with lasers, especially face pumped lasers.

The foregoing objects are achieved in the present invention wherein there is provided a gaseous, stationary, heat conductive layer in contact with the laser material; a solid material, optically transparent at the pump wavelength, surrounding and containing the gaseous, heat conductive layer; and a cooling fluid in contact with said solid for absorbing heat from said solid, whereby the laser is cooled by said liquid via the gas and liquid heat conductors.

In the specification, a distinction will be maintained between the terms "conductor" or "heat conductor" and "coolant." The term "conductor" refers to the conveyance of heat by a material from a source to a coolant, the conductor generally having a low heat capacity. The term "coolant" refers to a material for absorbing a relatively large amount of heat as a sink or reservoir.

A more complete understanding of the present invention may be obtained by considering the following description in conjunction with the attached drawings in which.

Figure 1:
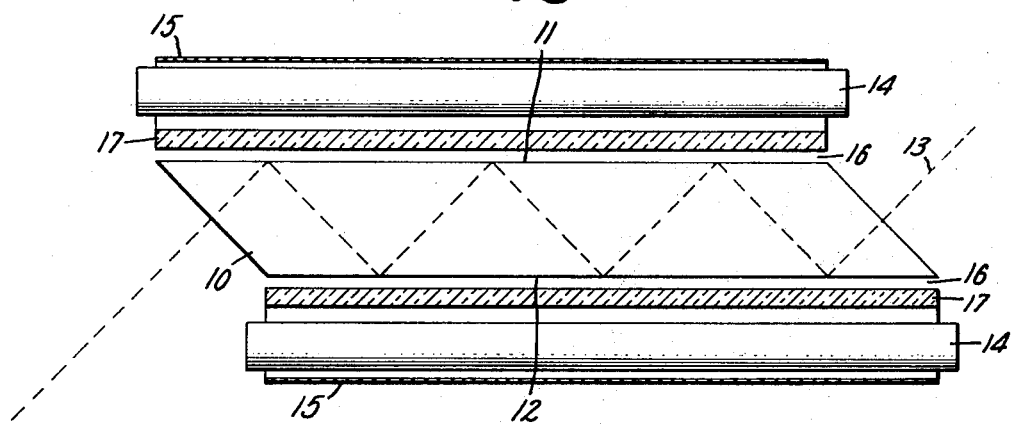
FIG. 1 illustrates one view of a laser incorporating a cooling system in accordance with the present invention.
Figure 2:
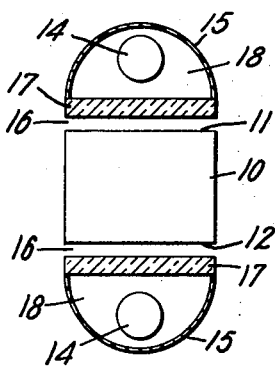
FIG. 2 illustrates another view of a laser incorporating a cooling system in accordance with the present invention.

FIGS. 1 and 2 showing side and end views, respectively, of the same specific embodiment will be described together. As shown in FIG. 1 there is provided a parallelepiped shaped block of laser material 10 having first and second faces 11 and 12, respectively. It is these surfaces 11 and 12 at which the total internal reflection must take place for the laser material to function as a faced pump laser. When suitably pumped, the laser beam generated within the laser material will zig-zag down the laser material along path 13, being totally internally reflected within surfaces 11 and 12. Pumping is provided by pump lamps 14 which serve to invert the population levels within the laser material 10. Around pump lamps 14 is a pump lamp reflector 15 which serves to reflect additional radiation from the pump lamp into the laser material.

The cooling of the laser material during operation is provided by a laminated cooling system comprising a gaseous layer 16, a solid layer 17, and fluid coolant 18. Gaseous layer 16 is a relatively thin layer of gas in contact with pump faces 11 and 12 and has a relatively low index of refraction. Thus, by having the gas in contact with the pump faces, the minimum angle of incidence is possible. Gaseous layer 16 acts as a thermal conductor, due to its relative thinness. The minimum thickness of the gas layer is about one wavelength at the laser radiation frequency. Thus, while one would normally consider gases as thermal insulators due to their low thermal conductivity, such is not the case here due to the short conduction path utilized in the layer between the face of the laser material and solid thermal conductor 17. Further, the heat transfer capabilities of the gas can be improved by using higher thermal conductivity gases such as hydrogen or helium.

In contact with gaseous layer 16 and containing it is a solid thermal conductor 17 which is also optically transparent to the pump radiation from pump lamp 14. During operation, the heat from the laser material is transferred by the gaseous layer to the high thermal conductivity optically transparent material which may comprise substances such as sapphire or Lucalox. The heat received by solid material 17 is then transferred to a fluid or liquid 18 which serves to cool the face or the edges of the material 17 opposite to laser material 10.

Thus, it can be seen that a cooling system has been devised which retains the advantages of gas cooling and liquid cooling without incumbering the system with the disadvantages of gas or liquid cooling per se. The low refractive index of gas is retained so as to make the angle of incidence for total internal reflection as small as possible and the high heat absorbing capabilities of a liquid cooled laser is retained so that the laser material can run at high repetition rates or high average power.

Having thus described the invention, it will be apparent to those of skill in the art that many modifications may be made without departing from the true spirit and scope of the present invention.

What I claim as new and desire to secure by Letters Patent of the United States is:

1. A coolable face pumped laser comprising:
   a block of laser material having a pair of parallel, rectangular surfaces, at least one of said surfaces acting as a pump face,
   an optical cavity for causing light generated within said material to resonate along a zig-zig path by being totally reflected at said surfaces,
   a lamp for optically pumping said laser material substantially uniformly along said pump face,
   cooling means thermally coupled to the pump face of said laser material and comprising a stationary layer of gas in contact with said pump face, a thermally conductive solid containing said gas and a cooling fluid in contact with said solid for absorbing heat therefrom, said gas layer being sufficiently thick to permit internal reflection of the resonating light while being sufficiently thin to permit the conduction of heat from said pump face through said solid to said cooling fluid, each of said gas layer, said solid and said cooling fluid being located in the optical path of the pumping radiation from said lamp to said pump face, whereby said laser material is cooled by said fluid via said gas and solid.

2. A coolable laser as set forth in claim 1 wherein said block of laser material is in the form of a parallel-epiped.

3. A coolable laser as set forth in claim 1 wherein said solid is sapphire.

4. A coolable face pumped laser comprising:
   a parallelepiped-shaped block of laser material, one pair of parallel rectangular sides of which form the pump faces of the laser, an optical cavity for causing light generated within said material to resonate along a zig-zig path by being totally internally reflected at said sides, a pair of lamps for optically pumping said laser material substantially uniformly along said pump faces, cooling means in thermal contact with said pump faces for cooling said laser material during laser operation, said cooling means comprising solid, liquid, and gaseous layers located in the optical paths of the pumping radiation from said lamps to said pump faces, wherein said gaseous layers all of low refractive index and contact said pump faces, said solid layers contain said gaseous layers, said gaseous layers being sufficiently thick to permit internal reflection of the resonating light while being sufficiently thin to permit the conduction of heat from said pump faces to said liquid layers through said gaseous and solid layers which act as thermal conductors, and said liquid layers, cool said solid layers, whereby said laser material is cooled by said liquid via said gaseous and solid layers.

* * * * *